(12) United States Patent
Pomara, Jr.

(10) Patent No.: US 6,170,391 B1
(45) Date of Patent: Jan. 9, 2001

(54) METHOD AND APPARATUS FOR PREPARING A FOLDED FOOD PRODUCT

(75) Inventor: Johnny B. Pomara, Jr., Carrollton, TX (US)

(73) Assignee: Industrial Catering, Inc., Grand Prairie, TX (US)

(*) Notice: Under 35 U.S.C. 154(b), the term of this patent shall be extended for 0 days.

(21) Appl. No.: 09/328,919

(22) Filed: Jun. 9, 1999

(51) Int. Cl.⁷ .............................. A21C 9/00; A21C 9/06; A21C 11/00
(52) U.S. Cl. .................. 99/450.6; 99/450.1; 99/450.2; 99/450.7
(58) Field of Search .................. 99/352–355, 494, 99/450.1–450.8, 483, 484; 53/209, 211, 215, 216; 425/383, 363, 373, 110, 112, 130, 298; 426/501, 502, 516, 297, 373, 497, 512

(56) References Cited

U.S. PATENT DOCUMENTS

| | | | |
|---|---|---|---|
| 3,757,676 | 9/1973 | Pomara, Jr. ........................ | 99/450.6 |
| 3,782,272 | 1/1974 | Cooper .............................. | 99/450.7 |
| 3,901,137 | * 8/1975 | Jimenez ............................. | 99/353 |
| 3,946,656 | * 3/1976 | Hsu ................................... | 99/450.1 |
| 4,014,254 | * 3/1977 | Ohkawa ............................. | 99/450.1 |
| 4,047,478 | * 9/1977 | Trostmann et al. ................ | 99/450.1 |
| 4,084,493 | 4/1978 | Quintana ........................... | 99/450.7 |
| 4,334,464 | * 6/1982 | Shinriki ............................. | 99/450.2 |
| 4,388,059 | * 6/1983 | Ma .................................... | 425/112 X |
| 4,393,758 | 7/1983 | Anmahian ......................... | 99/450.6 |
| 4,439,124 | * 3/1984 | Watanabe ......................... | 425/112 X |
| 4,457,225 | * 7/1984 | Bakker ............................. | 426/502 X |
| 4,516,487 | * 5/1985 | Madison et al. .................. | 99/450.7 |
| 4,517,785 | * 5/1985 | Masuda ............................ | 53/211 X |
| 4,608,919 | 9/1986 | Prows et al. ..................... | 99/450.6 |
| 4,637,304 | * 1/1987 | Suzuki ............................. | 425/383 X |
| 4,638,729 | 1/1987 | Woodworth et al. ............. | 99/450.6 |
| 4,691,627 | 9/1987 | Roberts ........................... | 99/450.6 |
| 4,913,043 | * 4/1990 | Chueng ........................... | 99/450.1 |
| 4,953,455 | * 9/1990 | Figueras et al. ................ | 53/215 |
| 5,263,407 | 11/1993 | Pomara, Jr. ..................... | 99/450.6 |
| 5,268,188 | 12/1993 | Diem et al. ..................... | 426/502 |

OTHER PUBLICATIONS

Video tape, Solbern Machine, undated.
Brochure, Solbern Burrito Folder, undated, May 18, 1998.

* cited by examiner

Primary Examiner—Timothy F. Simone
(74) Attorney, Agent, or Firm—Baker Botts L.L.P.

(57) ABSTRACT

An apparatus for preparing a folded food product includes a filling machine (128) operable to deposit a filling (30) on a food wrap (20). The apparatus further includes a first folding element (134 and 136) that is configured to fold a first section (22) of the food wrap (20) over the filling (30). Additionally, the apparatus has a creasing device (222) and a folding belt (214) that is operable to fold the food wrap (20) along first and second creases formed by the creasing device (222). Furthermore, the apparatus includes a first crease plate (328) that is operable to place a third crease (26) in the food wrap (20) after the food wrap (20) exits the folding belt (214), and a second folding element (334 and 336) configured to fold the food wrap (20) along the third crease (26). The apparatus also has a second crease plate (340) that is operable to place a fourth crease (28) in the food wrap (20), and a third folding element (338, 344 and 346) configured to fold the food wrap (20) along the fourth crease (28).

16 Claims, 9 Drawing Sheets

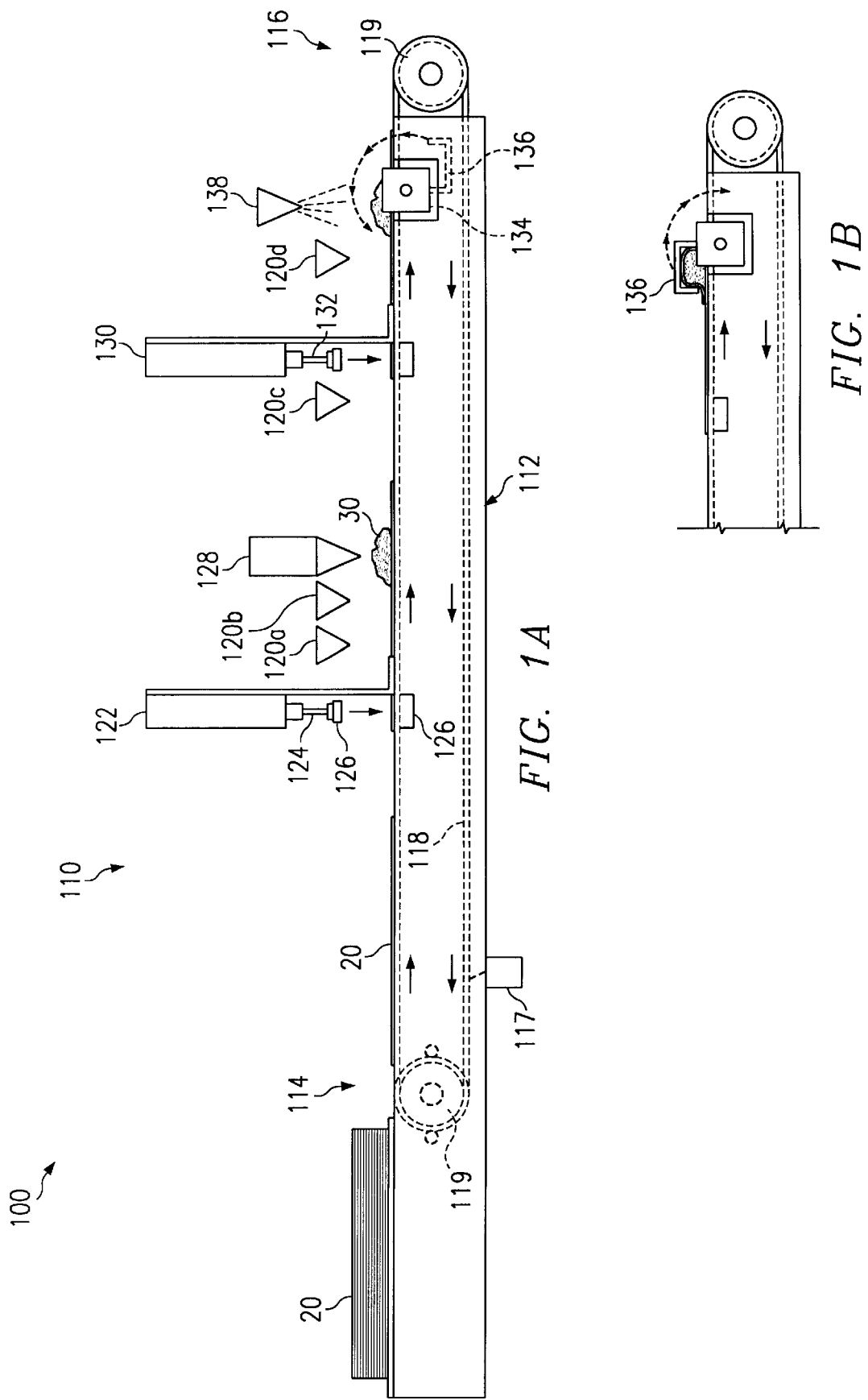

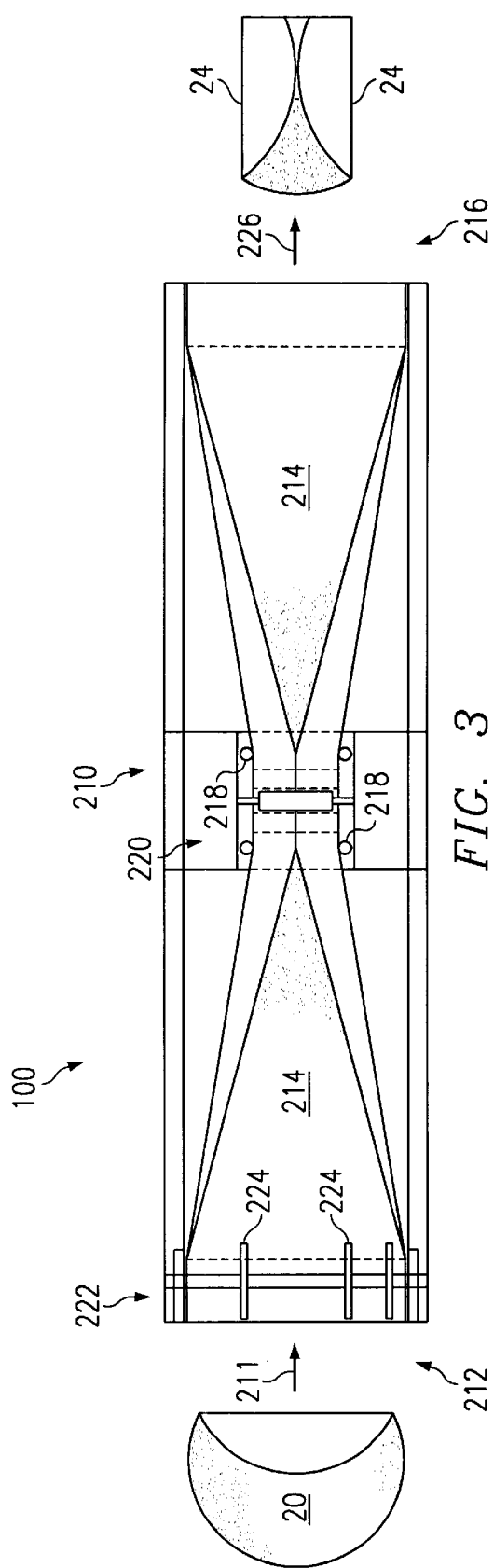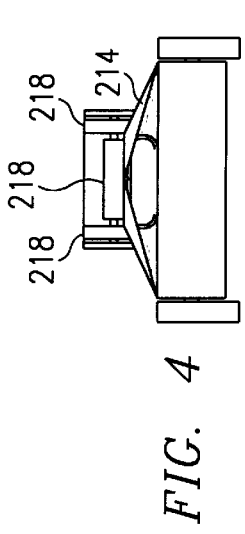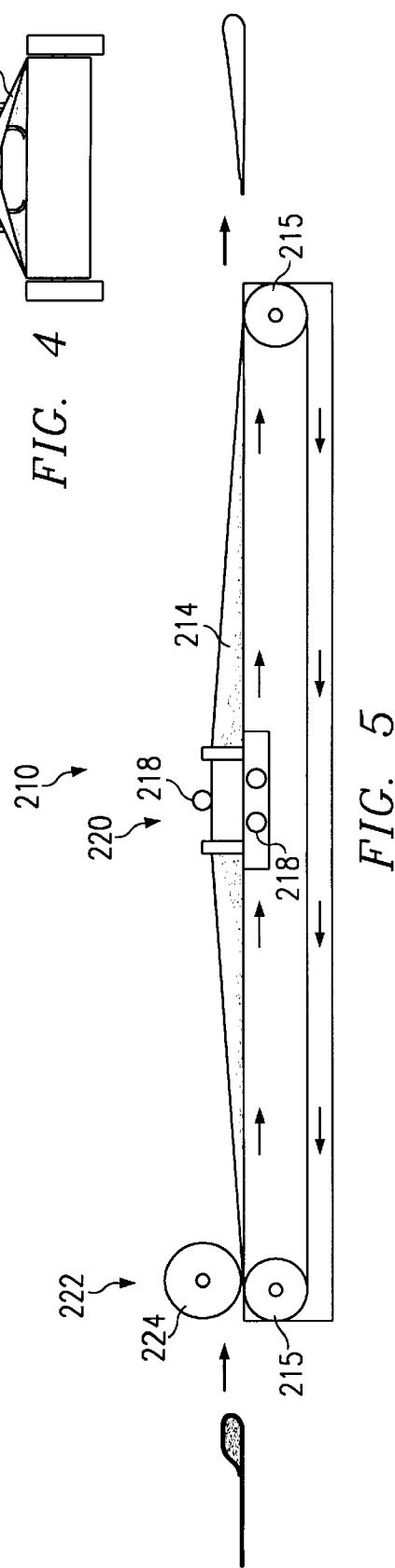

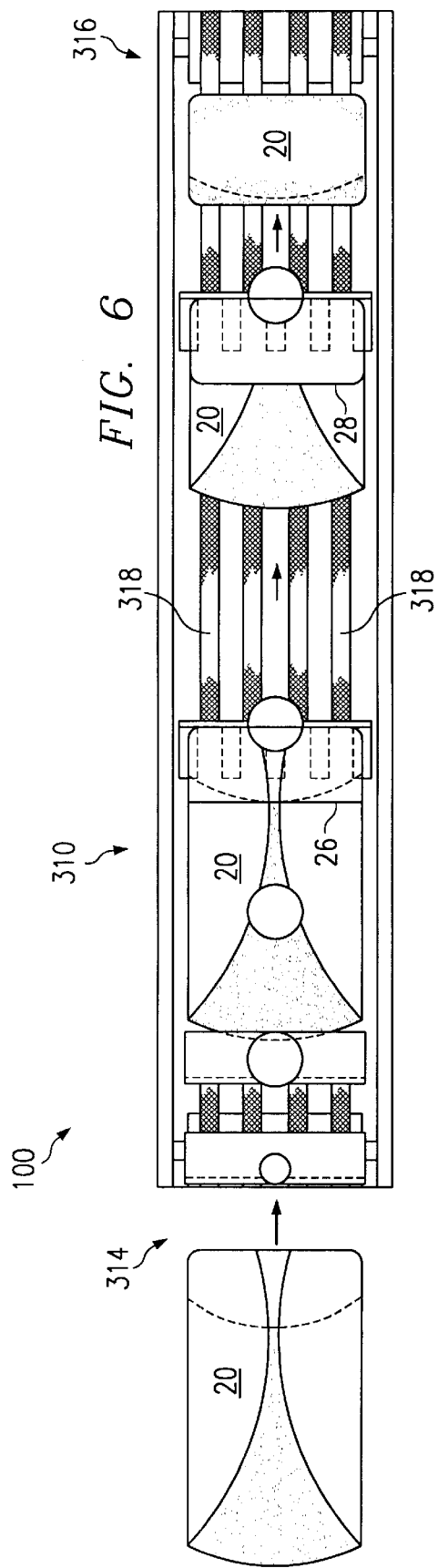
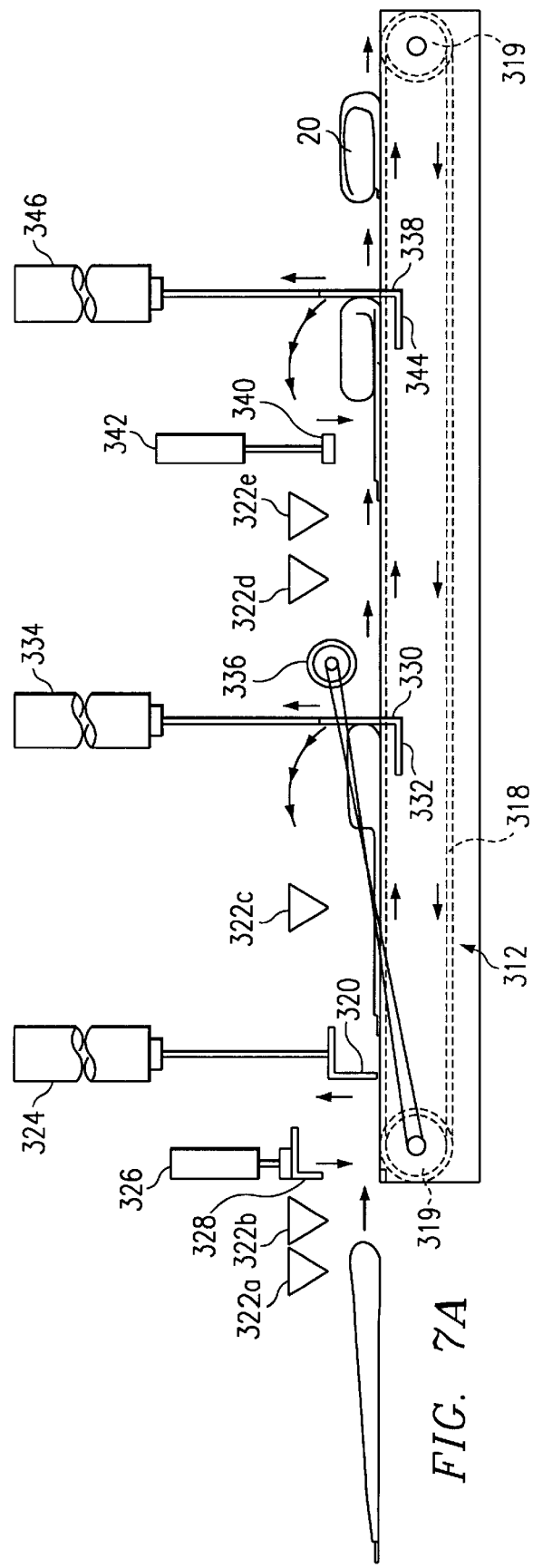

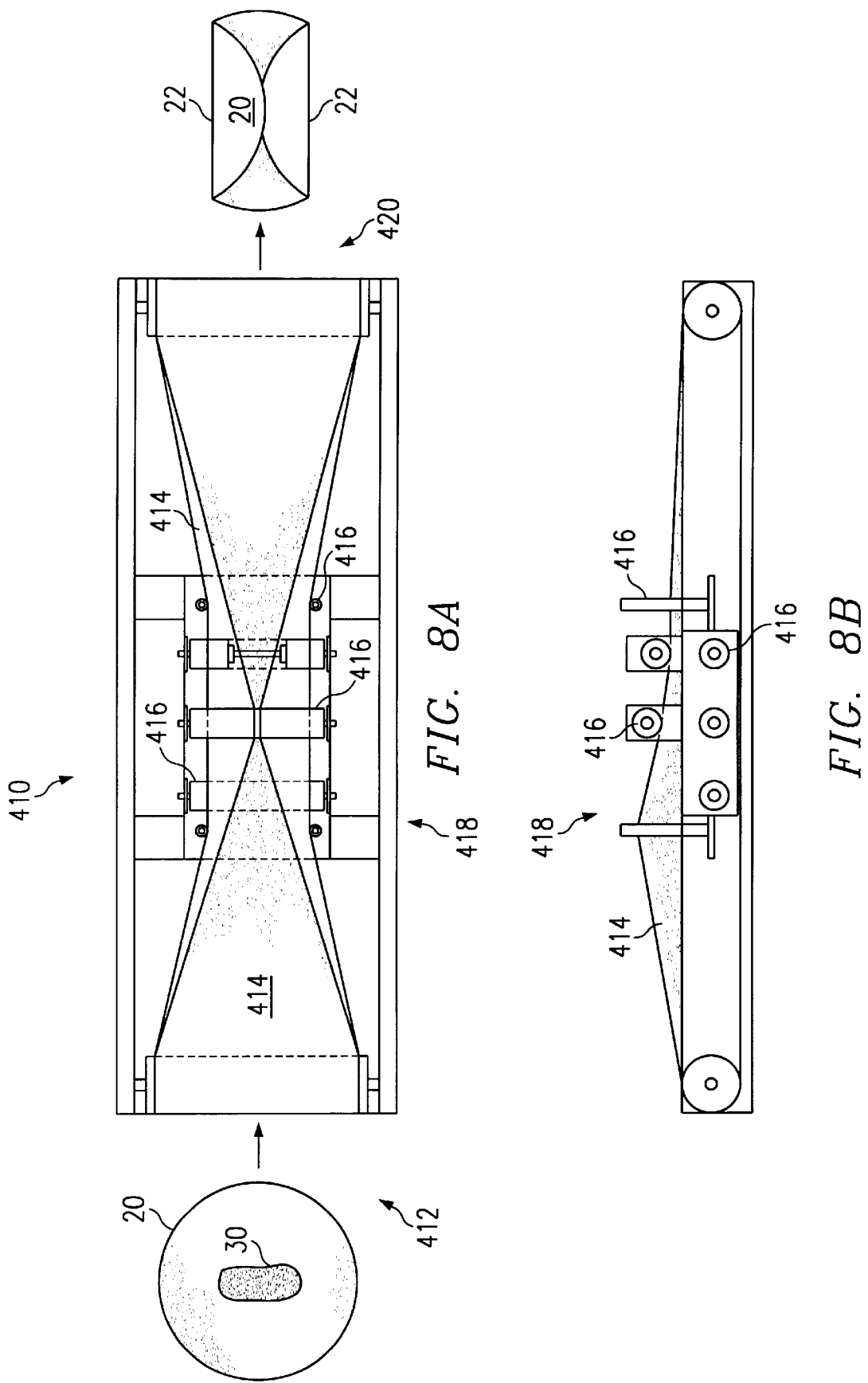

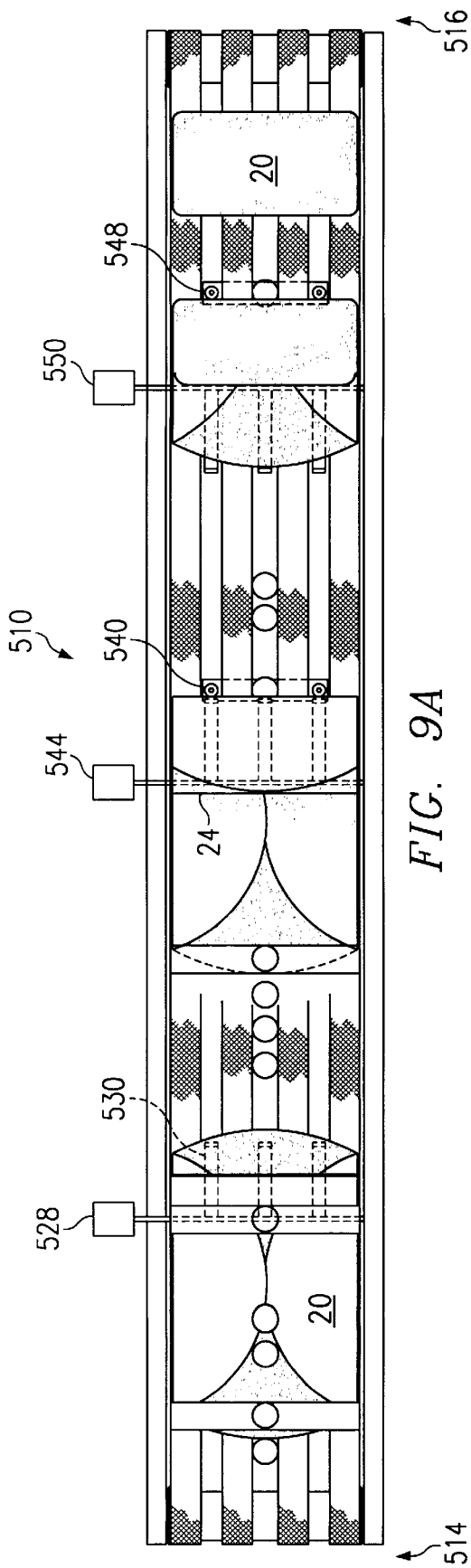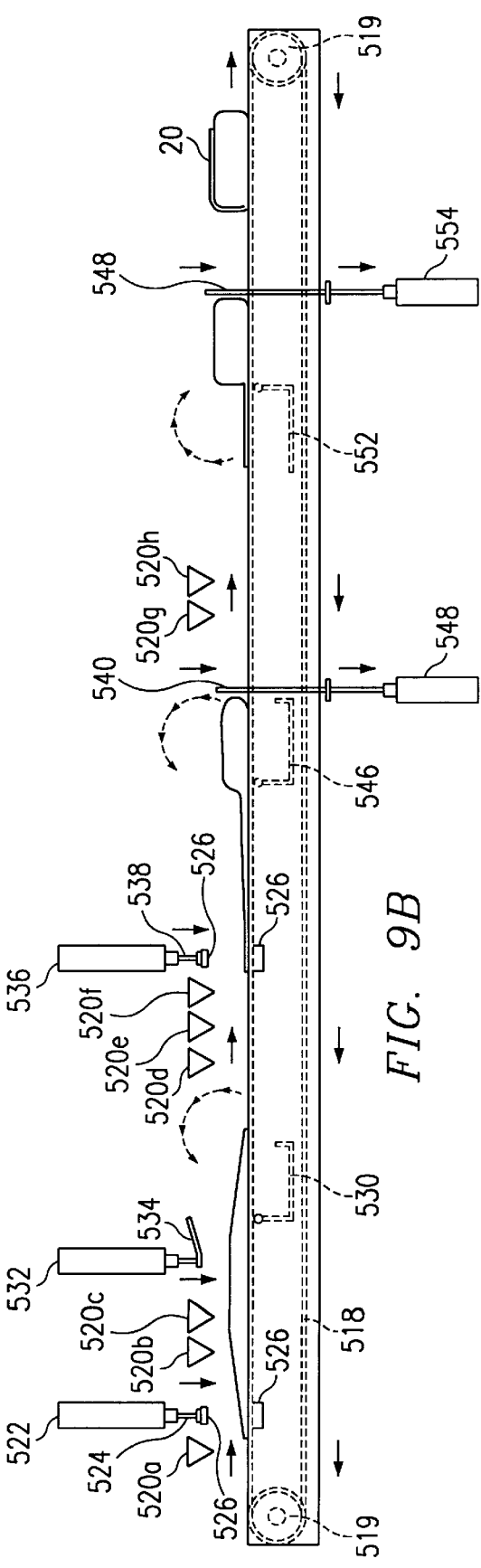

METHOD AND APPARATUS FOR PREPARING A FOLDED FOOD PRODUCT

TECHNICAL FIELD OF THE INVENTION

This invention relates generally to the field of food processing and more particularly to a method and apparatus for preparing a folded food product.

BACKGROUND OF THE INVENTION

In recent years, specialty food products, particularly Mexican food products, have become increasingly popular in the United States. Moreover, the increasing time demands upon families has caused an increase in the demand for heat and serve products. Particularly popular are frozen enchiladas, burritos, and other types of food products such as egg rolls that are offered for sale in the frozen food section of supermarkets. These foods are often sold individually or in packages containing several enchiladas or burritos. Typically the products need only be removed from the package, heated and served.

Historically, such products have been prepared manually by physically folding tortillas or other food wraps around a filling or fillings. This manual approach is time consuming, costly, and often produces products having an inconsistent or uneven appearance. In addition, manual preparation of these folded food-products introduces sanitation concerns.

In order to solve these problems, attempts have been made in the past to fabricate automated folding systems. However, such systems have typically been large and complex. For example, one automated folding system uses a series of plates that support the food wraps as they travel through the folding system. An individual plate supports each food wrap, and each plate has numerous folding parts that allow the plate to be manipulated to fold the food wrap supported by the plate. The plates travel through the system on a type of conveyor or drive, and then are reused once the food wrap that they support has been completely folded and removed from the plate. Due to the large number of moving parts in such a system creates, many complexities are created, which leads to malfunctions in the system and non-uniform folding of the food wraps.

Therefore, a need has arisen for a new method and apparatus for preparing a folded food product that overcome the disadvantages and deficiencies of the prior art.

SUMMARY OF THE INVENTION

A method for preparing a folded food product is disclosed. The method includes providing a food wrap, and depositing a filling on the food wrap. A first fold is created in the food wrap using a mechanical folding mechanism that folds a section of the food wrap over the filling. A second fold is created in the food wrap using a folding belt. A third fold is created in the food wrap using a mechanical lifting mechanism. The mechanical lifting mechanism lifts a section of the food wrap that contains a portion of the filling over the remaining section of the food wrap. A crease is placed in the food wrap along the desired location of one or more of these folds before creating the folds.

In another embodiment, an apparatus for preparing a folded food product in accordance with the invention is disclosed. The apparatus includes a filling machine that deposits a filling on a food wrap. The apparatus further includes a first folding element that is configured to fold a first section of the food wrap over the filling. Additionally, the apparatus has a creasing device that places creases in the food wrap, and a folding belt that folds the food wrap along the creases formed by the creasing device. Furthermore, the apparatus includes a first crease plate that places a third crease in the food wrap after the food wrap exits the folding belt, and a second folding element configured to fold the food wrap along the third crease. The apparatus also has a second crease plate that places a fourth crease in the food wrap, and a third folding element configured to fold the food wrap along the fourth crease.

A technical advantage of the present invention is that a method and apparatus are provided that satisfy the need for a fast and fully automatic process for the continuous preparation of high quality folded food products. By utilizing the present invention, labor costs and personnel requirements are greatly reduced. Food wraps are placed on the apparatus of the present invention, and the filling and folding of the food product is done automatically, without assistance from human operators. In addition, embodiments of the present invention produce folded food products that have a consistent quality, form and appearance.

Furthermore, because the present invention is continuous and completely automatic, operator handling of the food product and its ingredients is eliminated, thereby providing superior sanitation and cleanliness over manual processes. In addition, the present invention may be utilized in either single or multiple row fashion for producing large quantities of food products at a rapid rate.

BRIEF DESCRIPTION OF THE DRAWINGS

For a more complete understanding of the present invention, the objects and advantages thereof, reference is now made to the following descriptions taken in connection with the accompanying drawings in which:

FIG. 1A shows an elevation view of a first folding section of a folding machine incorporating teachings of the present invention;

FIG. 1B illustrates the operation of a mechanical folding mechanism of the first folding section of FIG. 1A;

FIG. 3 shows a plan view of a second folding section of the folding machine;

FIG. 4 illustrates an end view of the second folding section of FIG. 3;

FIG. 5 is an elevation view of the second folding section of FIG. 3;

FIG. 6 shows a plan view of a third folding section of the folding machine;

FIG. 7A illustrates an elevation view of the third folding section of FIG. 6;

FIG. 8A shows a plan view of a second folding section of an another folding machine incorporating teachings of the present invention;

FIG. 8B illustrates an elevation view of the second folding section of FIG. 8A;

FIG. 9A is a plan view of a third folding section of the folding machine of FIG. 8A;

FIG. 9B shows an elevation view of the third folding section of FIG. 9A;

DETAILED DESCRIPTION OF THE INVENTION

The preferred embodiments of the present invention and their advantages are best understood by referring to FIGS. 1 through 11B of the drawings, like numerals being used for like and corresponding parts of the various drawings.

Figure 2B:
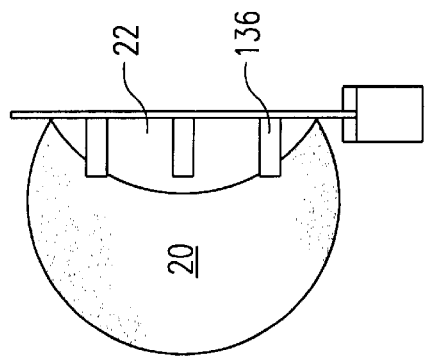
FIG. 2B further illustrates the operation of the mechanical folding mechanism of FIG. 1B.
Figure 2A:
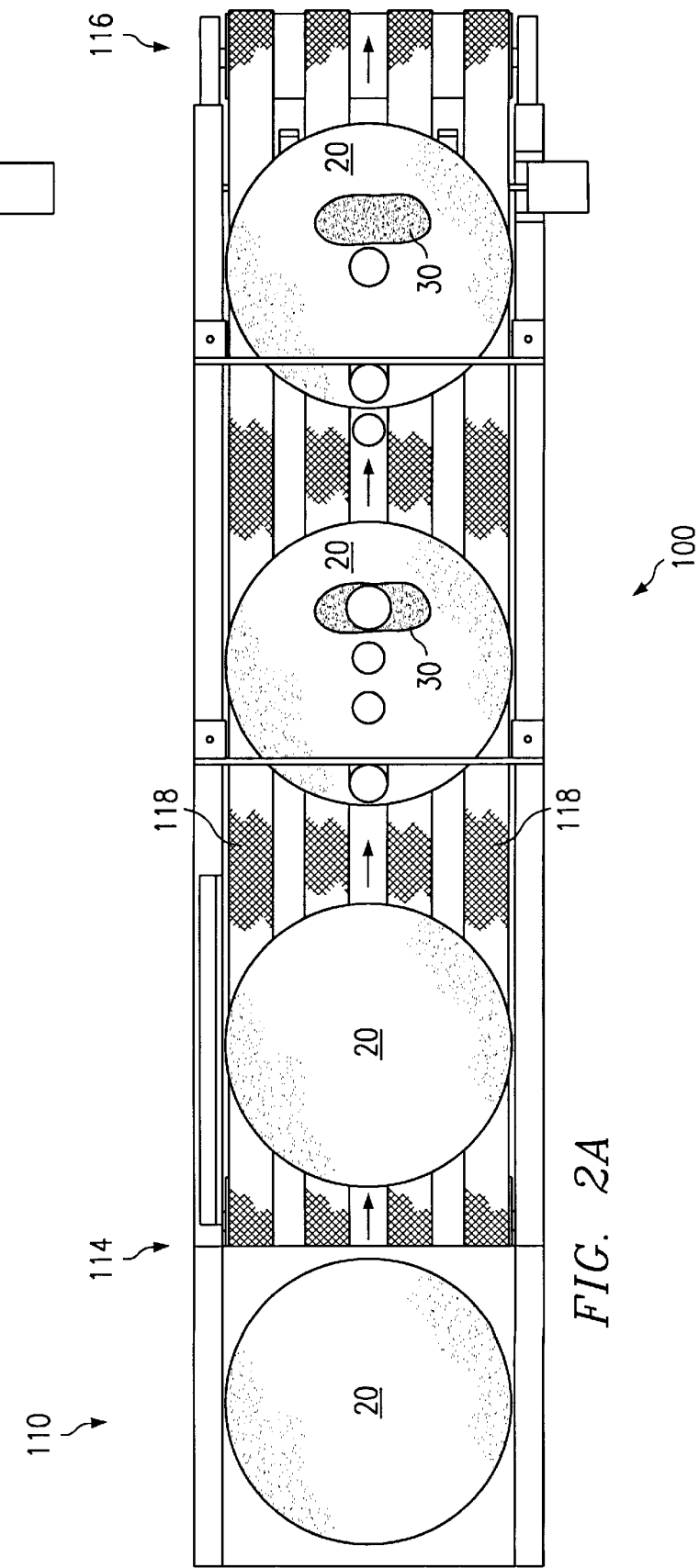
FIG. 2A is a plan view of the first folding section of FIG. 1A.

FIGS. 1A and 2A are an elevation view and a plan view, respectively, of a first folding section 110 of a folding machine 100. Folding machine 100 is operable to produce a folded food product by folding a food wrap 20 around a filling 30. First folding section 110 of machine 100 includes a conveyor 112 that is used to transport food wrap 20, such as a tortilla, from entry point 114 to an exit point 116 of first folding section 110. Food wrap 20 may be manually placed on conveyor 112 at entry point 114, or it may be automatically placed on conveyor 112 using a feed mechanism (not explicitly shown). The following description will follow a single food wrap 20 along folding machine 100. However, it will be understood that a number of food wraps 20 may be successively folded in an assembly-line manner.

Conveyor 112 includes a number of belts 118 that are positioned generally parallel to and apart from each other. Belts 118 are driven continuously during the operation of first section 110 by a pair of pulleys 119. Belts 118 are wrapped around pulleys 119 to form a continuous loop. A wiper 117 may be positioned against belts 118 in order to remove any filling 30 or other unwanted material from belts 118.

First section 110 further includes a plurality of photoelectric sensors 120, also known as "electric eyes." However, other suitable methods of sensing food wrap 20 may be used. Sensors 120 are used to detect the presence of food wrap 20 at various points along first section 110, and to engage various components of first section 110 in response to this detection. Sensors 120 may include timers to allow such engagement to occur a fixed period of time after sensor 120 detects food wrap 20.

After food wrap 20 is placed on conveyor 112, conveyor 112 moves food wrap 20 under a sensor 120a. Sensor 120a actuates a first air cylinder 122 which causes a shaft 124 to extend downwards toward conveyor 112. Shaft 124 is caused to extend downward by the introduction of pressurized air into air cylinder 122. It will be understood that other methods of actuating shaft 124, such as a hydraulic cylinder on an electric motor, may be used without departing from the scope of the present invention. Similarly, all other air cylinders described below may also be replaced by such other methods of actuation.

A first stop pad 126 is positioned on one end of shaft 124. When shaft 124 has extended fully, first stop pad 126 clamps food wrap 20 against a second stop pad 126 located between belts 118 of conveyor 112. Because stop pads 126 are positioned between belts 118, belts 118 continue to move even though food wrap 20 is clamped. Prior to food wrap 20 being clamped, food wrap 20 passes under sensor 120b. Sensor 120b actuates a filling machine 128, which deposits a filling 30 on food wrap 20 after food wrap 20 is clamped. Filling 30 may be any substance or substances that are desired to be wrapped in food wrap 20. For example, filling 30 may be a combination of meat, beans, and cheese used to make a burrito. It will be understood that a filling machines 128 may be used for each type of filling that is deposited on food wrap 20.

A timer associated with sensor 120a sends a signal to air cylinder 122 to retract shaft 124 after filling machine 128 has had sufficient time to deposit filling 30 on food wrap 20. After shaft 124 has retracted, conveyor 112 continues to transport food wrap 20 along first section 110. When food wrap 20 passes under a sensor 120c, sensor 120c instructs a second air cylinder 130 to extend a shaft 132 to clamp food wrap 20 in a similar fashion as described above. However, before food wrap 20 is clamped, food wrap 20 moves under sensor 120d. Sensor 120d causes a rotary actuator 134 to rotate a set folding fingers 136 once food wrap 20 has been clamped. A sprayer 138 may mist food wrap 20 and filling 30 with water prior to this rotation of fingers 136, so that food wrap 20 remains in place after it has been folded by fingers 136.

The operation of folding fingers 136 is shown in FIGS. 1B and 2B. As fingers 136 rotate counter-clockwise, they contact the underside of an end section 22 of food wrap 20, and fold end section 22 over filling 30. After fingers 136 have rotated approximately one hundred eighty degrees, actuator 134 rotates fingers 136 clockwise back to their initial position. Actuator 134 may be a pneumatic actuator, an electric motor, or any other suitable mechanism for rotating fingers 136. Similarly, all other rotary actuators described below may also include such methods of providing rotation. Folding fingers 136 may be straight, or they may have an angled end, as shown in FIG. 1B. In general, the combination of rotary actuator 134 and folding fingers 136 may be referred to as a mechanical folding mechanism.

After rotary actuator 134 returns folding fingers 136 to their starting position, second air cylinder 130 retracts shaft 132 to allow food wrap 20 to be further conveyed by belts 118 to an exit point 116. At exit point 116, food wrap 20 is transferred to a second folding section 210, illustrated in FIGS. 3 through 5.

FIGS. 3 through 5 are schematic diagrams showing a plan view, an end view, and an elevation view of second folding section 210. At exit point 116 of first section 110, conveyor 112 deposits food wrap 20 on folding belt 214 of second section 210, as indicated by arrow 211. Folding belt 214 is wrapped around and driven by a pair of pulleys 215. Folding belt 214 is a flexible belt, such as a polyurethane belt, that is generally flat at an entry point 212 at an exit point 216. However, at a folding point 220, folding belt 214 is directed between a plurality of rollers 218 which cause folding belt 214 to deform such that it has a generally elliptical cross-section, as shown in FIG. 4. Therefore, the surface of folding belt 214 that contacts food wrap 20 changes gradually from a flat surface to a generally enclosed elliptical shape, and then back to a flat surface.

After food wrap 20 is deposited at entry point 212, food wrap 20 travels under a creasing device 222. In the illustrated embodiment, creasing device 222 comprises a pair of creasing wheels 224 that place a pair of generally parallel creases in food wrap 20. These creases are generally perpendicular to the fold made by folding fingers 136, and define a pair of side sections 24 of food wrap 20. After being creased by creasing device 222, food wrap 20 travels along folding belt 214 and through folding point 220. As food wrap 20 approaches folding point 220, food wrap 20 conforms to the changing shape of folding belt 214. The changing shape of folding belt 214 causes each side section 24 of food wrap 20 to fold over onto the remaining portion of food wrap 20. Side sections 24 generally fold along the creases that were previously made by creasing wheels 224. After food wrap 20 has passed through folding point 220, folding belt 214 conveys food wrap 20 to exit point 216. At exit point 216, folding belt 214 deposits food wrap 20 on a conveyor 312 of a third folding section 310 as indicated by arrow 226.

Figure 7B:
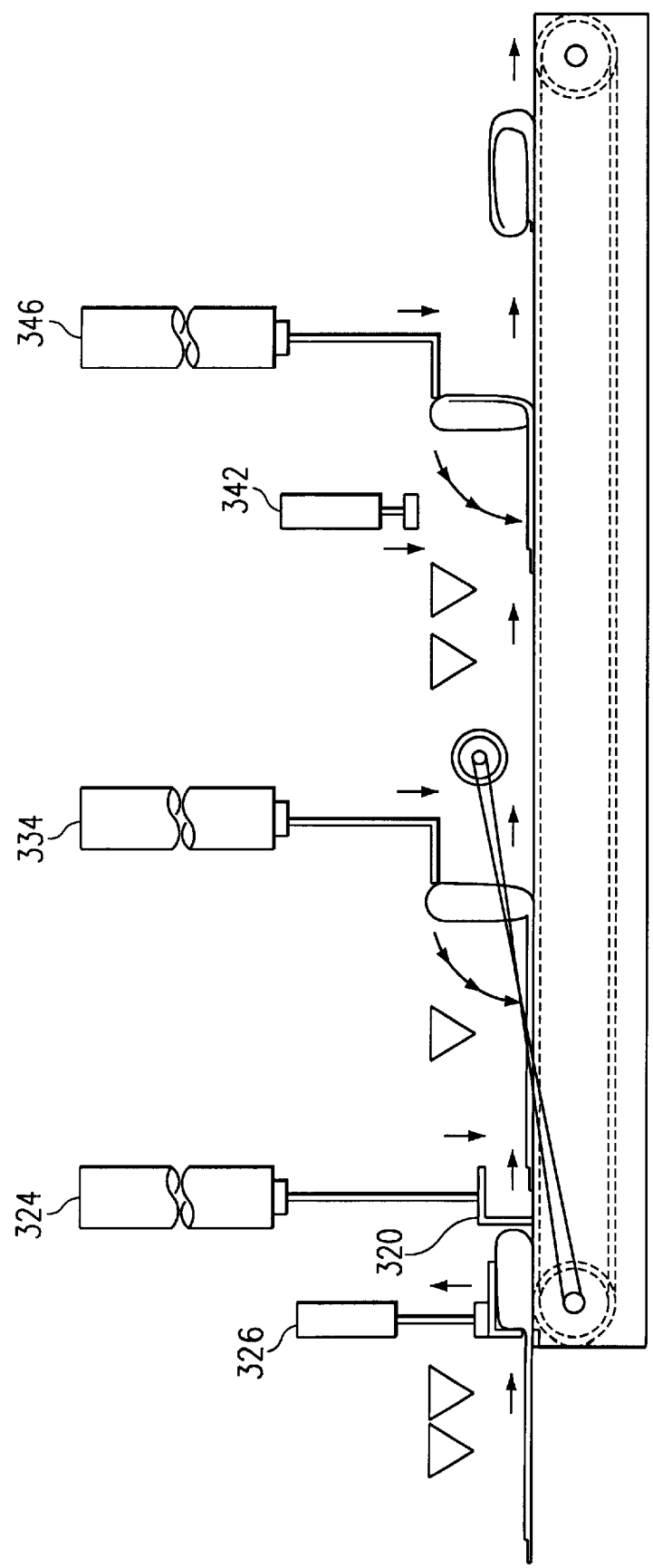
FIG. 7B is an elevation view of the third folding section of FIG. 6 with various element shown in an alternate operating position.

FIG. 6 illustrates a plan view of third section 310. FIGS. 7A and 7B show elevation views of third section 310, with various elements shown in alternate positions in the two figures. Conveyor 312 of third folding section 310 transports food wrap 20 from an entry point 314 to an exit point 316. As with conveyor 112 of first section 110, conveyor 312 comprises a plurality of belts 318. Belts 318 are positioned generally parallel to and spaced apart from each other, and are disposed in a continuous loop around a pair of pulleys 319. As conveyor 312 moves food wrap 20 along third section 310, food wrap 20 stops against a stop plate 320. Stop plate 320 is coupled to a first air cylinder 324 that is used to raise and lower stop plate 320. The default position of stop plate 320 is in a down position in proximity to belts 318, as shown in FIG. 7A.

As food wrap 20 approaches stop plate 320, it passes under a photoelectric sensor 322a. Sensor 322a uses a timer to cause a second air cylinder 326 to extend a crease plate 328 down against food wrap 20, as shown in FIG. 7B, after food wrap 20 has stopped against stop plate 320. Crease plate 328 places a crease 26 along food wrap 20 that is generally perpendicular to the folds made by folding belt 214. After crease plate 328 places crease 26 in food wrap 20, second air cylinder 326 retracts crease plate 328 to its original position. First air cylinder 324 then retracts stop plate 320, as shown in FIG. 7B, allowing food wrap 20 to continue along conveyor 312. After food wrap 20 has passed completely under stop plate 320, a sensor 322b causes first air cylinder 324 to return stop plate 320 to its original down position, so that it may stop a subsequent food wrap 20.

As conveyor 312 moves food wrap 20 along third section 310, food wrap 20 contacts and stops against a lift plate 330. Lift plate 330 has a number of lifting fingers 332 that extend generally perpendicularly from lift plate 330 under belts 318. Once food wrap 20 has contacted lift plate 330, a sensor 322c causes a third air cylinder 334 to raise lift plate 330 and its associated lifting fingers 332. As lift plate 330 is raised, food wrap 20 resumes movement on belts 318. Simultaneously, lifting fingers 332 lift a portion of food wrap 20 and filling 30 and fold this portion along crease 26, as shown in FIG. 7B. In general, the combination of folding fingers 332, lift plate 330 and air cylinder 334 may be referred to as a mechanical lifting mechanism. The mechanical lifting mechanisms and the mechanical folding mechanisms, described above, may be generically referred to as folding elements.

Belts 318 next move food wrap 20 under a press wheel 336. Press wheel 336 is positioned over belts 318 such that it slightly compresses and flattens the portion of food wrap 20 containing the majority of filling 30. Press wheel 336 may be fabricated from a soft material, such as foam, to prevent damage to or excessive flattening of food wrap 20 and filling 30. Food wrap 20 is then conveyed to and stops against a second lift plate 338. Second lift plate 338 has a set of lifting fingers 344 similar to lifting fingers 332 of first lift plate 330. Once food wrap 20 has contacted second lift plate 338, sensor 120d triggers the actuation of a second crease plate 340 having an operation similar to first crease plate 328. Second crease plate 340, actuated by a fourth air cylinder 342, places a crease 28 in food wrap 20 generally parallel to crease 26 made by first crease plate 328. Once crease 28 a is made and crease plate 328 is retracted, a fifth air cylinder 346 lifts second lift plate 338, and lifting fingers 344 cause food wrap 20 to fold over itself to complete the folded food product, as shown in FIG. 7B.

FIGS. 8A through 9B show a folding machine 400 representing another embodiment of the present invention. In this particular embodiment, no mechanical lifting mechanisms are used, and the order of folding is different than in folding machine 100. Folding machine 400 uses a folding belt and three mechanical folding mechanisms to fold food wrap 20 with folds similar to those made by folding machine 100. A first section (not explicitly shown) of folding machine 400 comprises a conveyor and a filling machine. This first section is similar to first section 110 of folding machine 100, except that no fold is made in the food wrap. The first section simply operates to place a filling on the food wrap.

FIGS. 8A and 8B illustrate a plan view and an elevation view, respectively, of a second folding section 410 of folding machine 400. The unfolded food wrap 20 leaves the first folding section and enters second section 410 at an entry point 412. Second section 410 includes a flexible folding belt 414 that operates in a similar manner to folding belt 214 of folding machine 100. Folding belt 414 passes through a series of rollers 416 at a folding point 418. The changing shape of folding belt 414 due to rollers 416 causes food wrap 20 to fold along edges 22, as shown in FIG. 8A. It should be noted that the configuration of rollers 416 is different than the configuration of rollers 218 of folding machine 100. Rollers 416 (and rollers 218) may be configured in any manner that provides an appropriate deformation of folding belt 414 at folding point 418.

Folded food wrap 20 is transferred to a third folding section 510 at an exit point 420. FIGS. 9A and 9B illustrate third folding section 510 of folding machine 400. Food wrap 20 is deposited on a conveyor 512 of third section 510 at an entry point 514. Conveyor 512 comprises a plurality of belts 518 disposed around a pair of pulleys 519, and spaced apart from one another as described above in conjunction with folding machine 100.

After food wrap 20 is deposited on conveyor 512, food wrap 20 passes under sensors 520a, 520b and 520c. As with sensors 120 and 320 of folding machine 100, sensors 520 are typically photoelectric sensors with timing controls. Sensor 520a actuates a first air cylinder 522. First air cylinder 522 includes a shaft 524 having a stop pad 526 attached to one end of shaft 524. As described above in conjunction with folding machine 100, first cylinder 522 extends shaft 524 to clamp food wrap 20 between stop pad 526, located on the end of shaft 524, and a stop pad 526 located between belts 518. A second sensor 520b triggers the operation of a first rotatory actuator 528 once food wrap 20 has been clamped. Actuator 528 rotates a set of folding fingers 530 counterclockwise from under belts 518 to fold food wrap 20 as shown in FIG. 9B. Actuator 528 then rotates fingers 530 back to their original position.

After fingers 530 retract to their original position, a sensor 520c, under which food wrap 20 passed before it was clamped, instructs a second air cylinder 532 to actuate a crease plate 534. Crease plate 534 places a crease 24 on food wrap 20 that ensures a proper fold at the next folding mechanism. Second air cylinder 534 retracts crease plate 534, and then first air cylinder 522 retracts shaft 524 and stop pad 526 to allow the continued movement of food wrap 20.

Food wrap 20 next passes under sensors 520d, 520e and 520f, and stops against a set of stop pins 540. Sensor 520d causes a third air cylinder 536 to extend a shaft 538. As with shaft 524, shaft 538 includes a stop pad 526 that clamps food wrap 20 against another stop pad 526. Sensor 520e instructs a second rotary actuator 544 to rotate a set of folding fingers 546 counter-clockwise to fold food wrap 20 along crease 24. Fingers 546 are then retracted to their original position under belts 518, and third air cylinder 536 raises shaft 538 and stop pad 526 to release food wrap 20. In addition, a fourth air cylinder 542 lowers stop pins 540 to allow food wrap to continue along conveyor 512. After food wrap 20 has cleared stop pins 540, sensor 520f instructs fourth air cylinder 542 to raise stop pins 540 in order to stop a subsequent food wrap 20.

After food wrap has been released, it passes under sensors 520g and 520h and stops against stop pins 548. Sensor 520g then instructs a third rotary actuator 550 to rotate a set of folding fingers 552 clockwise to place a final fold in food wrap 20, as shown in FIG. 9B. The fingers then retract under belts 518, and sensor 520h causes a fifth air cylinder 554 to lower stop pins 548, allowing food wrap 20 to resume movement. After food wrap 20 has cleared stop pins 548, fifth air cylinder raises stop pins 548 to stop a subsequent food wrap 20. After being released food wrap 20 continues to an exit point 516 where it leaves folding machine 400.

Figure 10A:
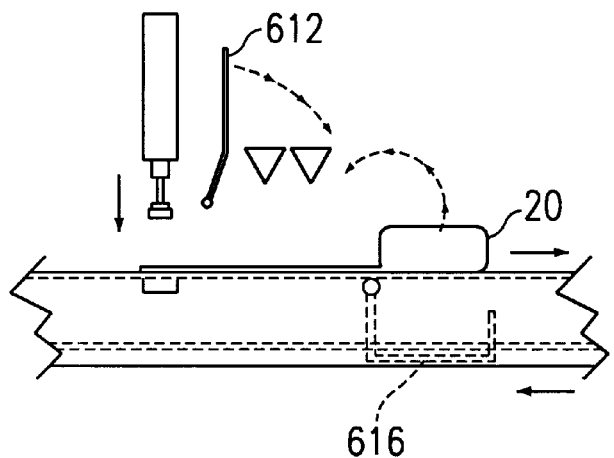
FIG. 10A illustrates an elevation view of a retaining mechanism for use in the present invention in a first operating position.
Figure 10B:
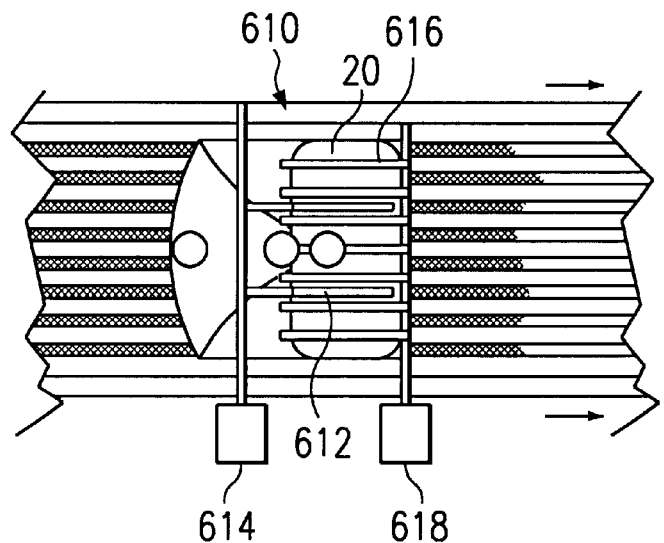
FIG. 10B is a plan view of the retaining mechanism of FIG. 10A in a second operating position.
Figure 10C:
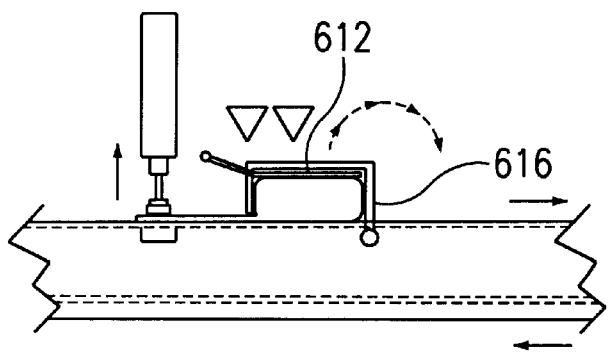
FIG. 10C is an elevation view of the retaining mechanism of FIG. 10A in the second operating position.

FIGS. 10A through 10C illustrate a feature that may be used with any mechanical folding mechanism described above. This feature is a retaining mechanism 610. Retaining mechanism 610 includes a set of retaining fingers 612 that are actuated by a rotary actuator 614. As illustrated in FIG. 10A, retaining fingers are initially in a vertical position as food wrap 20 moves under retaining mechanism 610. Once food wrap 20 is stopped, the mechanical folding mechanism—a set of folding fingers 616 actuated by a rotary actuator 618- folds food wrap 20 as shown in FIGS. 10B and 10C.

Before actuator 618 retracts folding fingers 616 from their position shown in FIG. 10C, actuator 614 rotates retaining fingers 612 approximately ninety degrees clockwise such that fingers 612 are in contact with folded food wrap 20. Folding fingers 616 may then be retracted while retaining fingers 612 remain in position to hold down the section of food wrap 20 that was just folded. Once food wrap 20 is allowed to continue its movement along the conveyor, food wrap 20 slides from under retaining fingers 612. In this manner, a more precise fold is maintained in food wrap 20.

Figure 11A:
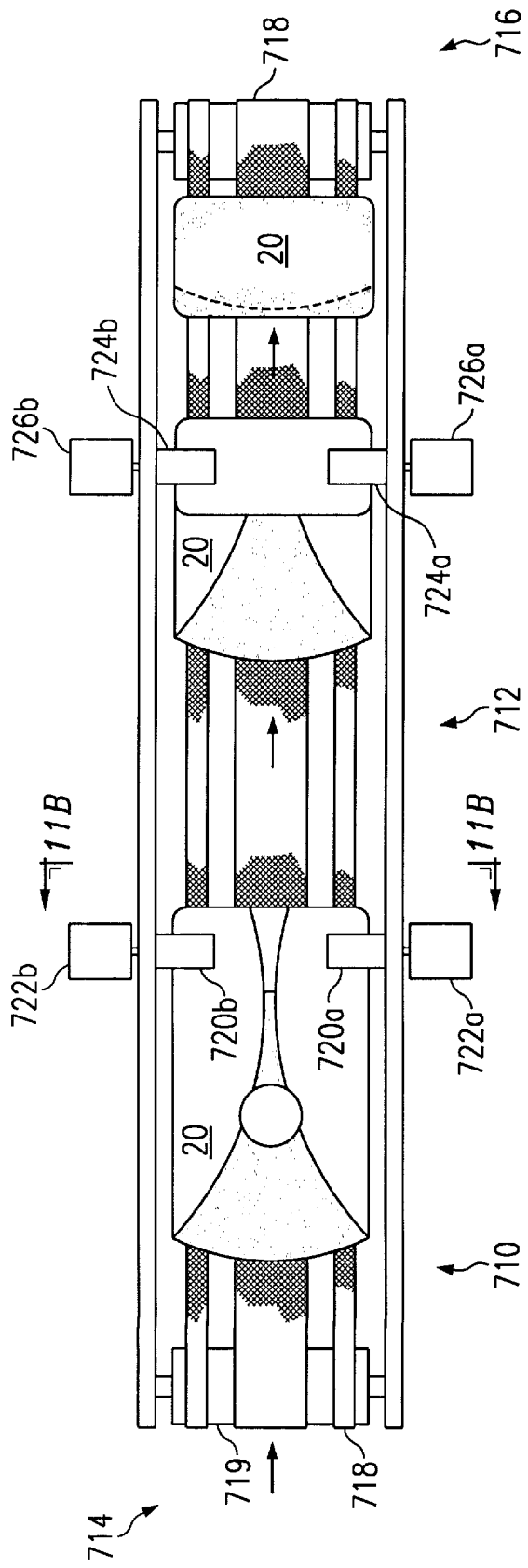
FIG. 11A shows a plan view of a folding section incorporating mechanical turning mechanisms for folding a food wrap.
Figure 11B:
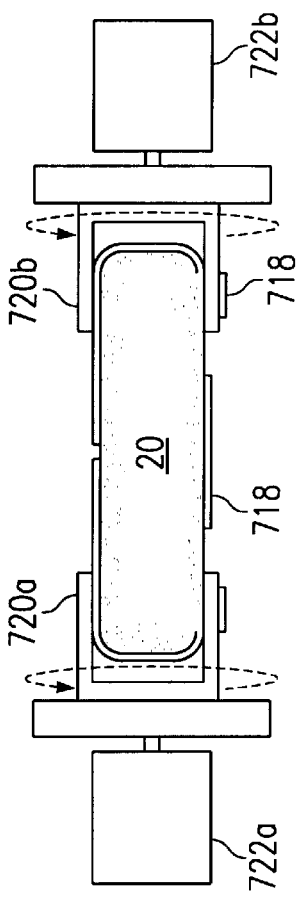
FIG. 11B illustrates a cross-section of the folding section of FIG. 11A taken along line 11B—11B of FIG. 11A.

Referring now to FIGS. 11A and 11B, an alternate folding section 710 for folding a food wrap 20 is illustrated. Folding section 710 is configured as illustrated to replace third folding section 310 of folding machine 100 (illustrated in FIGS. 6 through 7B). However, as described below, folding section 710 may be alternatively configured for use with other folding machines.

Folding section 710 includes a conveyor 712 that moves food wrap 20 from entry point 714 to exit point 716. Conveyor 712 is comprised of a plurality of belts 718 that are driven by a pair of pulleys 719. As illustrated in FIG. 11A, food wrap 20 enters folding section 710 at entry point 714 in a folded configuration similar to the configuration food wrap 20 has before entering third section 310 of folding machine 100. Conveyor 712 moves food wrap down folding section 710 until food wrap is disposed between a pair of turning fingers 720a and 720b. FIG. 11B shows a cross-section of folding section 710 taken along line 11B—11B of FIG. 11A. This cross-section shows how food wrap 20 is disposed between turning fingers 720a and 720b.

Once food wrap 20 is so positioned, a sensor (not explicitly shown) causes actuators 722a and 722b to rotate fingers 720a and 720b, respectively, approximately one hundred eighty degrees towards entry point 714. This rotation causes the portion of food wrap 20 positioned between fingers 720a and 720b to be folded back on top of the rest of food wrap 20 to form a fold in food wrap 20. After food wrap 20 has been so folded, it continues down conveyor 712. Once food wrap 20 has cleared fingers 720a and 720b, fingers 720a and 720b rotate back to their original position.

The turning process described above is repeated by turning fingers 724a and 724b, which are rotated by actuators 726a and 726b, respectively. This second turning process creates the final fold in food wrap 20, and food wrap 20 is then moved to exit point 716 by conveyor 712. Folding section 710 may be modified for use with folding machine 200 through the addition of a third pair of turning fingers and associated actuators. Such a configuration could replace second folding section 510 of folding machine 200 (illustrated in FIGS. 9A and 9B). In this case, the three pairs of turning fingers of modified folding section 710 would produce substantially the same folds as the three mechanical folding mechanisms of second folding section 510.

While the invention has been particularly shown and described by the foregoing detailed description, it will be understood by those skilled in the art that various other changes in form and detail may be made without departing from the spirit and scope of the invention.

What is claimed is:

1. An apparatus for preparing a folded food product, comprising:

a filling machine operable to deposit a filling on a food wrap;

a first folding element configured to fold a first section of the food wrap over the filling;

a creasing device;

a folding belt operable to fold the food wrap along first and second creases formed by the creasing device;

a first crease plate operable to place a third crease in the food wrap after the food wrap exits the folding belt;

a second folding element configured to fold the food wrap along the third crease;

a second crease plate operable to place a fourth crease in the food wrap; and a third folding element configured to fold the food wrap along the fourth crease.

2. The apparatus of claim 1, wherein the first folding element comprises:

at least one rotatably mounted folding finger;

an actuator coupled to the finger and operable to rotate the finger so as to contact a bottom surface of the food wrap and to fold the food wrap.

3. The apparatus of claim 1, further comprising a first conveyor positioned between the filling machine and the folding belt, the first conveyor comprising a plurality of belts spaced apart from and generally parallel to one another.

4. The apparatus of claim 3, wherein the first folding element is positioned such that a finger of the first folding element can pass between the plurality of belts of the first conveyor to fold the food wrap.

5. The apparatus of claim 1, further comprising a clamping device positioned such that it may extend and contact the food wrap so as to temporarily prevent the movement of the food wrap.

6. The apparatus of claim 5, wherein the clamping device comprises:
   an actuator having:
      a cylinder; and
      a shaft positioned in the cylinder and operable to move in response to the introduction of a high pressure fluid into the cylinder;
   a first stop pad positioned at an end of the shaft; and
   a second stop pad positioned such that the food wrap may be clamped between the first and second stop pads when the shaft is moved.

7. The apparatus of claim 5, further comprising a photoelectric sensor operable to detect the food wrap and to control the actuator in response to such detection.

8. The apparatus of claim 1, further comprising a photoelectric sensor operable to determine the presence of the food wrap.

9. The apparatus of claim 1, further comprising a stop plate capable of being positioned to prevent the movement of the food wrap during an actuation of the first crease plate.

10. The apparatus of claim 1, wherein the second and third folding elements each comprise:
   a plate operable to prevent the movement of the food wrap;
   at least one finger extending from the plate such that the finger extends under the food wrap when the food wrap contacts the plate; and
   an actuator coupled to the plate and operable to lower the plate to prevent the movement of the food wrap and to raise the plate to fold the food wrap with the finger.

11. The apparatus of claim 1, further comprising a second conveyor positioned between the folding belt and the third folding element, the second conveyor comprising a plurality of belts spaced apart from and generally parallel to one another.

12. The apparatus of claim 11, wherein the second and third folding elements are each positioned such that a finger of each folding element can pass between the plurality of belts of the second conveyor to fold the food wrap.

13. The apparatus of claim 1, further comprising a retaining mechanism rotably mounted over the conveyor and operable contact the food wrap to hold a fold made by a folding element.

14. An apparatus for preparing a folded food product, comprising:
   a filling machine operable to deposit a filling on a food wrap;
   a mechanical folding mechanism to fold a first section of the food wrap over the filling;
   a pair of creasing wheels;
   a folding belt operable to fold the food wrap along first and second creases formed by the creasing wheels; and
   a turning mechanism operable to rotate a portion of the food wrap and the associated filling to create a fold generally perpendicular to the first and second creases.

15. The apparatus of claim 14, wherein the mechanical folding mechanism comprises:
   at least one rotatably mounted folding finger;
   an actuator coupled to the finger and operable to rotate the finger so as to contact a bottom surface of the food wrap and to fold the food wrap.

16. The apparatus of claim 14, wherein the turning mechanism comprises:
   a pair of turning fingers sized such that a portion of the food wrap and the associated filling may fit between the fingers after exiting the folding belt; and
   an actuator operable to rotate the pair of fingers so as to flip the portion of the food wrap and the associated filling positioned between the fingers to create the fold in the food wrap.

* * * * *

UNITED STATES PATENT AND TRADEMARK OFFICE
CERTIFICATE OF CORRECTION

PATENT NO. : 6,170,391 B1
DATED : January 9, 2001
INVENTOR(S) : Johnny B. Pomara, Jr.

It is certified that error appears in the above-identified patent and that said Letters Patent is hereby corrected as shown below:

<u>Title page,</u>
Item [73], Assignee, before "Industrial Catering, Inc., Grand Prairie, TX (US)" please insert -- Johnny B. Pomara, Jr., Carrollton, TX (US) --

Signed and Sealed this

Tenth Day of August, 2004

JON W. DUDAS
*Acting Director of the United States Patent and Trademark Office*